United States Patent [19]

Wideman

[11] Patent Number: 4,606,964
[45] Date of Patent: Aug. 19, 1986

[54] BULKED WEB COMPOSITE AND METHOD OF MAKING THE SAME

[75] Inventor: Ronald H. Wideman, Menasha, Wis.

[73] Assignee: Kimberly-Clark Corporation, Neenah, Wis.

[21] Appl. No.: 801,164

[22] Filed: Nov. 22, 1985

[51] Int. Cl.$^4$ .......................... B32B 3/28; B32B 5/04; B32B 7/12; B32B 7/14
[52] U.S. Cl. .......................................... 428/152; 2/67; 2/69.5; 2/221; 2/237; 2/270; 5/448; 5/487; 5/495; 5/DIG. 1; 15/209 B; 15/209 C; 156/73.1; 156/73.5; 156/85; 156/163; 156/164; 156/290; 156/308.4; 428/161; 428/166; 428/172; 428/230
[58] Field of Search ............... 428/101, 152, 161, 166, 428/172; 156/163, 164, 290, 308.4

[56] References Cited

U.S. PATENT DOCUMENTS

| 1,917,456 | 7/1933 | Mickelson . | |
|---|---|---|---|
| 2,021,352 | 11/1935 | Eustis . | |
| 2,434,111 | 1/1948 | Hawley, Jr. et al. . | |
| 2,957,512 | 10/1960 | Wade et al. . | |
| 3,316,610 | 5/1967 | Manock . | |
| 3,574,109 | 4/1971 | Yoshikawa | 428/152 |
| 3,586,557 | 1/1968 | Rogers, Jr. | 156/85 |
| 3,597,299 | 7/1968 | Thomas et al. . | |
| 3,728,203 | 4/1973 | Taylor | 428/152 |
| 3,832,256 | 8/1974 | Kaiwaites | 156/179 |
| 3,974,025 | 8/1976 | Ayers | 162/113 |
| 4,150,800 | 4/1979 | Clausen et al. | 242/131 |
| 4,259,220 | 3/1981 | Bunnelle et al. | 260/27 |
| 4,337,771 | 7/1982 | Pieniak et al. . | |
| 4,418,123 | 11/1983 | Bunnelle et al. | 428/517 |
| 4,503,108 | 3/1985 | Clausen et al. | 428/108 |

Primary Examiner—James C. Cannon
Attorney, Agent, or Firm—Donald L. Traut

[57] ABSTRACT

A bulked web composite comprises a differentially tensioned reticulated web of elastic material bonded to at least one gatherable web whereby, upon release of the tensioning forces, the gatherable web or webs are gathered by the reticulated web with different degrees of bulking in different areas due to the different tension levels of the reticulated web. Also disclosed is a method of making a bulked web composite by the steps of: forming a reticulated web of elastic material and elongating at least portions of the web by differentially tensioning it, and bonding the differentially tensioned web to at least one gatherable web to form a composite. The composite is then relaxed whereby portions of the gatherable web are gathered by the contracted reticulated web with different degrees of bulking in different areas. Bulked web composites of such type may be employed to form disposable swim wear, towels, wash cloths, and the like.

15 Claims, 5 Drawing Figures

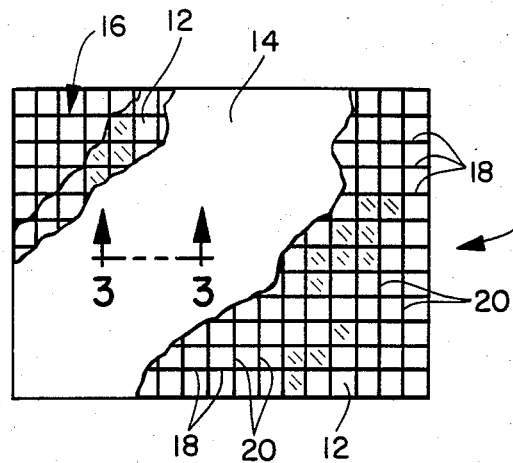
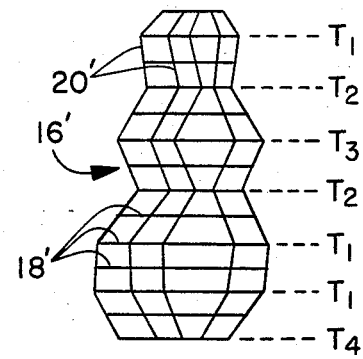
FIG. 1
FIG. 2
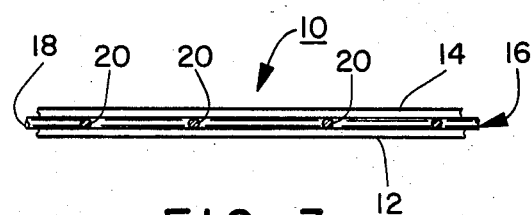
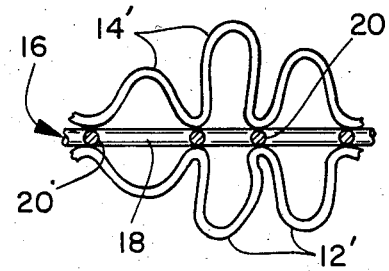
FIG. 3
FIG. 5
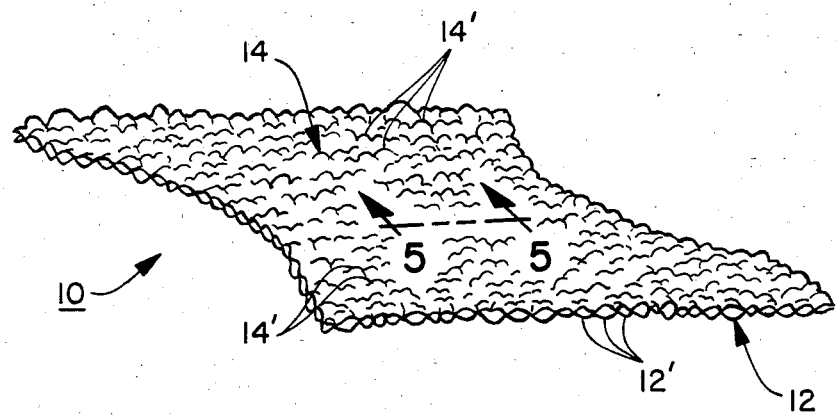
FIG. 4

BULKED WEB COMPOSITE AND METHOD OF MAKING THE SAME

BACKGROUND OF THE INVENTION

1. Field of the Invention

This invention generally relates to bulked composite material which finds use in various applications such as disposable garments, towels, cleaning cloths, and the like.

2. Description of the Related Art

U.S. Pat. No. 2,021,352 to W. Eustis describes an elastic sheet material comprising an extensible fabric coated with rubber from a latex solution or dispersion, in the form of a grid (page 2, lines 30–32). In lines 21–57 on page 3, this patent discloses that it is desirable in some fabrics to have the rubber under an initial tension when the fabric is in its normal contracted condition, such as by stretching the composite fabric and loading the textile fibers with a filler to prevent contraction of the fabric and retain the rubber coating under tension. Alternatively, the stretched fabric may be coated on the side opposite to the originally applied rubber coating, to maintain such coating under tension. The foregoing refers to the broad teaching in the patent "to have the rubber under an initial tension when the fabric is in its normal and unstretched or contracted condition" (page 3, lines 21–24).

U.S. Pat. No. 2,434,111 to P. G. Hawley, Jr., et al discloses manufacturing elastic fabric, by adhesively combining elastic material with an extensible textile fabric. Elongation of the textile fabric in the finished product is uniformly increased throughout in one direction by gathering the fabric's opposite edges and stretching them in a transverse direction before combining with the elastic material. Elastic material may be applied as a coating of rubber on the fabric with subsequent drying and/or vulcanizing of the solids to form an adhered elastic layer, or it may be calendered on the fabric.

U.S. Pat. No. 3,597,299 to G. D. Thomas, et al discloses a disposable wash cloth comprising a scrim with thermoplastic adhesive-carrying creped threads preferably of heat-shrinkable material, bonded between and to creped cellulose wadding layers.

U.S. Pat. No. 3,316,136 discloses a composite fabric comprising an elastic layer and an overlying woven fabric. An adhesive may be applied in a pattern to the elastic material which then is stretched and the overlying fabric contacted therewith in pressure engagement, to adhere the two layers. When the adhesive is dry, tension on the elastic material is released, causing the overlying non-elastic fabric to gather in the areas outlined by the adhesive.

U.S. Pat. No. 2,957,512 discloses an elastic composite sheet material comprising a reticulated, fibrous web of an elastomeric material formed by extruding a liquid dispersion of the elastomeric material into a high velocity gas stream to produce a plurality of discontinuous fibers which are dried, set, collected and bonded at crossover points. A relaxed sheet material is pattern bonded to a stretched web of the elastomeric material, to form a corrugated composite body.

U.S. Pat. No. 4,337,771 discloses a disposable diaper with reticulated elastic ribbons disposed at the central side margins to gather the diaper edges.

U.S. Pat. Nos. 4,150,800 to V. H. Clausen, et al; 4,259,220 to W. L. Bunnelle, et al; and 4,503,108 to V. H. Clausen, et al disclose various hot-melt adhesives for reinforcement of composite webs wherein the adhesive is utilized in elastic bands or coatings for reinforcing filaments.

SUMMARY OF THE INVENTION

In accordance with the present invention there is provided a bulked composite material comprising a reticulated web of elastic material which, while held under differential tension forces, is bonded to at least one gatherable web, the composite material having gathers formed therein by contraction of differentially tensioned portions of said reticulated web upon release of the tension force whereby the composite is more bulked in some areas than in others.

In one aspect of the invention, the reticulated web, which may comprise a polyurethane resin, is bonded between two gatherable webs. In still another aspect of the invention, the reticulated web comprises strands of elastic material bonded together to form the web; in any case, individual strands may have different elastic characteristics. In another aspect of the invention the reticulated web comprises hot-melt extruded strands of elastic self-adherent material bonded under tension to one another, for example, the hot-melt extruded strands of elastic self-adherent material may be formed of a thermoplastic synthetic resin and rubber block copolymer composition.

The present invention provides for a discrete web of the composite material having an hourglass-like configuration including a medial portion narrower and more highly bulked than its end portions, the higher bulk being obtained by placing the medial portion of the reticulated web under greater tension than the end portions while bonding the reticulated web to the gatherable web.

In its method aspects, the present invention provides a method of making a bulked web composite, comprising: forming a reticulated web of elastic material, e.g., form elastic materials having different elastic characteristics; elongating at least portions of the web by differentially tensioning different portions of the reticulated web; bonding the differentially tensioned web to at least one gatherable web, e.g., between two gatherable webs to form a composite material; and relaxing the composite to gather portions of the gatherable web.

In one aspect, the reticulated web is formed from individual strands joined together while held under tension.

In another aspect, the invention provides for forming the composite web in an hourglass-like configuration having a medial portion which is narrower than its end portions and tensioning the medial portion of the reticulated web of a discrete web of the composite material to a greater extent than its end portions whereby, upon release of the tensioning forces, the composite contracts into a higher bulked configuration in the medial than in the end portions.

BRIEF DESCRIPTION OF THE DRAWINGS

FIG. 1 is a schematic plan view of a reticulated web of differentially tensioned elastic strands, sandwiched between two gatherable webs to form a composite which is held under tension (by means not shown), with parts of the composite broken away for clarity of illustration;

FIG. 2 is a schematic plan view of a reticulated web of elastic strands showing its configuration after release of the tensioning forces imposed on some of the (horizontally disposed) strands during formation of the web;

FIG. 3 is a cross-sectional view on an enlarged scale, taken along line 3—3 of FIG. 1;

FIG. 4 is a perspective view of a bulked web composite, such as one obtained from the assembly of FIG. 1; and FIG. 5 is a cross-sectional view on an enlarged scale taken along line 5—5 of FIG. 4.

DETAILED DESCRIPTION OF THE PREFERRED EMBODIMENTS

In the practice of the present invention, a differentially tensioned reticulated web of elastic material is employed, for example, by being bonded between a facing pair of gatherable sheets or webs of material to provide, upon release of the tensioning forces, a bulked material. As used herein and in the claims, the term "differentially tensioned" in reference to the reticulated web of elastic material, means that at least two different levels of tension are applied to the reticulated web or to strands thereof, so that tensional forces are different in different portions of the web. The reticulated web may be formed from individual elastic strand elements and then subjected to different tension levels in various portions thereof by the application of tensioning forces to stretch portions of the web. Alternatively, the constituent strands may, prior to being bonded to one another to form the web, be subjected to different tension levels and the elongated strands bonded to one another under such differential tension. In either case, the result is the provision of a web having different tension levels in various portions thereof. The reticulated web, while held under the different tensioning forces, is bonded to one or more gatherable webs of material to form a composite. Upon release of the tensioning forces to free the components, the latter will differentially contract, i.e., with different amounts of contraction in different areas depending upon the amount of local tension applied and the characteristics of the strands, to gather the reticulated and gatherable webs into a bulked composite.

The tensional forces may be applied in any manner, as for example along one axis of the web or alternatively along different axes of the web, such as, for example, along respective length and width axes which are perpendicular one to the other, or in specific areas of the web, as desired. The resulting composite, when relaxed, has different levels of contraction and gathering at different locations.

The term "elastic" used to characterize the reticulated web material and composite articles of the present invention has its usual meaning in that it refers to materials which are stretchable to an elongation greater than their untensioned dimension and which, upon release of the tensioning force, can recover a substantial proportion of the elongation. For example, suitable elastic materials useful in the present invention are those which can be stretched to an elongation of at least about 25% of their relaxed dimensions, i.e., which can be stretched to at least about one and one-quarter times their relaxed dimension, and upon release of the stretching force will recover at least about 40% of the elongation. For example, a material which is stretched to elongate it to 125% of its unstretched dimension, should contract to not more than about 115% of its unstretched dimension, i.e., recover at least about 40% of the elongation, upon release of the tensioning forces. At least for some purposes of the present invention, elastic materials which upon release of the stretching force recover all or nearly all of their elongation, which is often considerably greater than 25% of their relaxed dimension, e.g., 100% to 200% or more of their relaxed dimension, are useful.

The materials useful to form the reticulated webs thus include all suitable elastic materials capable of being formed into reticulated webs, such as by being formed into strands and bonded together to form reticulated stranded structures. Any other suitable techniques may of course be used to form the integral reticulated webs, so long as portions of the web are tensioned differentially from other portions to provide the desired effect. Illustrative elastic materials include butadiene/acrylonitrile copolymers, styrene/isoprene copolymers, polyurethane elastomers, and the like. One class of useful elastic materials includes hot-melt extrudable materials which may be, but need not be, self-adhering in character. The term "self-adhering" or "self-adherent" as used herein in reference to the hot-melt extruded materials means that they are sufficiently adhesive so that individual elements thereof will adhere to one another with sufficient bonding strength to provide structural coherence, and includes hot-melt materials to which a tackifier is added or present prior to extrusion. Preferred hot-melt extrudable, self-adhering materials include thermoplastic synthetic resin and rubber block copolymer compositions, such as those described in U.S. Pat. No. 4,418,123 to Bunnelle and commercially available from H. B. Fuller Company as FULLASTIC® extruded self-adhering elastics; TUFTANE® elastic adhesive commercially available from B.F. Goodrich Company, which is a polyurethane based composition; and Borden 6341 hot-melt adhesive, available from The Borden Company.

FIG. 1 shows a tensioned composite web 10 comprised of a first gatherable web 12 and a second gatherable web 14 (portions of which are broken away for clarity of illustration) between which is sandwiched a reticulated web 16. In accordance with the present invention, the strands of reticulated web 16 are bonded to each other and reticulated web 16 is bonded to webs 12 and 14 while at least some of the strands 18, 20 of reticulated web 16 are maintained under tension at a tension level different from that of others of the strands. Any known suitable means (not shown in FIG. 1) may be employed to hold composite web 10 under tension. The reticulated elastic web 16 is formed of a plurality of cross strands 18, which are disposed horizontally in FIG. 1, and longitudinal strands 20, which are disposed vertically in FIG. 1. The appellations "cross" and "longitudinal" are arbitrary with regard to the illustrated embodiment but in a machine made composite web, for example, strands 18 may be cross direction strands and strands 20 machine direction strands. In any case, the strands 18, 20 may be made of any suitable elastic material such as a hot-melt extruded elastic self-adherent material, cut into predetermined lengths and arrayed and tensionally bonded together to form the reticulated web 16. When a self-adherent elastic material is used, the self-adherent nature of such strands causes them to firmly join to one another at their cross-over points, i.e., the points of contact between the respective cross and longitudinal strands, so as to produce a coherent mesh or net configuration. Alternatively, the strands 18 and 20 may be made of suitable elastic materials which are not self-adhering materials and thus must be tensionally bonded by being joined together at their respective cross-over points by means such as a suitable adhesive or thermal bonding, e.g., ultrasonic bonding, or any other suitable means. The term "tensionally bonded" as used herein in reference to strand elements of the reticulated elastic web means that such elements are subjected to tensional forces at the time they are bonded to one another. In other words, at least some of the elements, e.g., strands, are stretched and maintained under tension while being bonded. Similarly, the term "tensionally bonded" in reference to a reticulated web of elastic material bonded to a gatherable web means that such web is subjected to tensional forces at the time it is bonded to a gatherable web. However joined or bonded together, the strands 18 and 20 of the reticulated web 16 are bonded to one another while held under differentially tensioned conditions. For example, the respective cross strands 18 may be subjected to different levels of tensioning forces while the longitudinal strands 20 are subjected to a uniform tensional force or left untensioned. The reticulated web 16, while held in its differentially tensioned condition, is tensionally bonded to a gatherable web or webs, such as webs 12 and 14, to form the resulting composite 10. As in the case of bonding strands 18 and 20 to each other, the web 16 may be bonded to one or more gatherable webs, e.g., webs 12 and 14, by thermal, e.g., ultrasonic, bonding or by a suitable adhesive or by using a selfadherent elastic material for the web 16 and/or at least one of the webs 12, 14. Upon release of the respective tensioning forces after bonding the web 16 to the gatherable web(s), the web 16 contracts to gather the webs 12 and 14 into gathers and provide a bulked material with variations in bulking attained at least in part by selecting local tension levels. FIG. 2 shows a reticulated web 16' (without a gatherable web bonded thereto) comprised of strands 18', 20' and in a relaxed state after release of different tensioning forces $T_1$, $T_2$, $T_3$ and $T_4$ applied to the indicated ones of strands 18'. The web 16' is contracted to a different extent at different tension locations. The different contraction levels will depend upon the magnitude of the locally applied tensioning forces, the strength and elastic characteristics of the particular strands and the resistance to gathering offered by the stiffness of the gatherable web or webs bonded to the reticulated web 16'.

While individual strands 18 and 20 may all be substantially the same with respect to composition, cross-sectional size and cross-sectional shape, it is within the purview of the present invention to vary one or more of the composition, cross-sectional size and cross-sectional shape of different ones of the strands comprising the reticulated web. In this manner, elastic characteristics and the degree of elongation imparted by a given tensioning force will result in differentially tensioned portions of the reticulated web.

When self-adherent strands are used to form the web 16, in some cases (depending in part on the degree of tension imposed on the strands of the reticulated web 16 and the nature of the gatherable webs 12, 14) it is feasible to self-bond the web 16 to the first and second gatherable webs 12 and 14. Alternatively, or in addition, a suitable adhesive may be used to bond the reticulated web 16 to a gatherable web as, for example, by roller coating an adhesive onto the top and bottom surfaces of the reticulated web 16 to adhere it to the gatherable webs. It may be desirable in some instances to utilize a tackifier component in hot-melt extruded materials to adhere the strands together to form the reticulated web 16. In such case, after forming the web 16, it may be detackified such as by dusting the web with talc or other detackifying agent so that the material has a smooth, non-sticky feel. In some instances, it may be useful to utilize one side of the reticulated web with its surface tacky (for joining to the gatherable web of the composite) and with the opposite side detackified in the aforementioned manner. In any event, the reticulated web 16 is bonded while held under tension, i.e., it is tensionally bonded, to the first and second gatherable webs 12 and 14.

First and second webs 12 and 14 may be any suitable gatherable material, such as a woven material, a nonwoven material, a fibrous or a polymeric film material and may be, although they need not necessarily be, an elastic material. As used herein and in the claims, a "gatherable" material is one which, when bonded to the reticulated web while the latter is under tension, will gather, with the formation of puckers or gathers, to accommodate contraction of the reticulated web upon release of the tensioning forces. Suitable fibrous gatherable webs may utilize any suitable natural and/or synthetic fibers, for example, woven or nonwoven webs of fibers made of acrylic polymers, polyester, polyamide, glass, polyolefins, e.g., polyethylene and polypropylene, cellulosic derivatives such as rayon, cotton, silk, wool, pulp, paper and the like, as well as blends or combinations of any two or more of the foregoing. The gatherable webs may also comprise polymeric film layers such as polyethylene, polypropylene, polyamide, polyester, acrylic polymers, and compatible mixtures, blends and copolymers thereof.

As shown in FIG. 3, cross strands 18 and longitudinal strands 20 of reticulated web 16 provide an intermediate layer in the composite web 10 wherein top gatherable web 14 and bottom gatherable web 12 are bonded to the tensioned web 16. Upon release of the tensioning forces, elongated strands such as cross strands 18 contract, to a greater or lesser degree, depending on how much tension they have been held under during bonding, the strength, size and elastic characteristics of the individual strands employed and the resistance to gathering offered by webs 12 and 14.

Upon release of the tensioning forces, the tensioned strands contract and the gatherable material of webs 12 and 14 are formed into puckers or gathers 12', 14' which, as shown in the perspective view of FIG. 4, may be irregular and varied across the length and width of the composite material depending upon the variations in tensioning forces and, optionally, different elastic and other characteristics of the strands used in different portions of the web 16. Thus, in FIG. 1 the composite 10 is shown with the strands 18, 20 thereof held under tension (by means not shown) and with gatherable webs 12, 14 bonded to the differentially-tensioned web 16 in a substantially non-gathered configuration. FIGS. 4 and 5 show the composite 10 after the tensioning forces have been released and with webs 12, 14 gathered by contraction of the reticulated web 16 to form gathers 12', 14' whereby the reticulated web 16, and consequently the composite 10, returns to a relaxed state. Accordingly, the attached gatherable webs will gather and provide a bulked composite having significantly increased bulk as compared to the tensioned composite of FIG. 1 from which it was formed. Reference herein and in the claims to increased or more highly "bulked" areas of the composite means those areas containing a larger quantity of gathered webs per unit area.

It will be appreciated that by controlling the amount of tension applied to specific areas of the reticulated web 16, and by selecting the elastic characteristics and size of the strands used in various areas of the web 16, the amount of contraction and therefore of bulking of a given gatherable web or webs can be controlled as desired in selected portions of the composite. The amount of bulking will also be affected by the basis weight and stiffness characteristics of the gatherable webs utilized.

For example, in a reticulated web comprising a discrete rectangular array of strand elements of the type shown in FIG. 1, the horizontal strands in the central section of the web could be placed under higher tension than other tensioned strands. By appropriately sizing the composite, upon release of the tensioning forces, the result would be an hourglass-shaped article which would exhibit more bulking in the narrow region than in the wider end regions; such construction is suitable for the manufacture of disposable diapers or pantry-like garments wherein the high-bulked narrow region corresponds to the crotch region of the garment and the end regions correspond to the waistband portions thereof. For example, FIG. 4 shows such an hourglass-like configuration which could be attained by stretching an intermediate group of strands 18 to a greater extent than the strands at the upper and lower (as viewed in FIG. 1) ends of the composite 12 so that, upon release of the tensioning forces, they contract to a greater extent. Alternatively, the intermediate group of strands could comprise lighter and/or more elastic strands than those at the ends of the composite, to give greater contraction and bulking in the center than at the ends. By varying the nature of strands making up the web 16, it will be appreciated that elasticity and degree of bulking may be varied throughout the product as desired.

In forming a composite material such as composite 10, the constituent strands 18, 20 of the reticulated web 16 may be individually laid on one of the adjacent gatherable web materials 12 or 14 and the other gatherable web applied thereover to bond the web 16 to and between the webs 12 and 14. Alternatively, only one gatherable web, e.g., web 12, may be employed and the web 16 may be left exposed on one side. Further, the reticulated web 16 may be initially formed and held under tension as described above wherein the constituent strands are tensionally bonded to one another, following which the reticulated web is bonded under tension to the gatherable web or webs.

The features and advantages of the present invention are illustrated by the following Example.

EXAMPLE

Tackified FULLASTIC ® hot-melt adhesive material is fed into an extruder through a hopper, with the extruder and associated die being at a temperature of approximately 193° C. (386° F.). The hot-melt elastic is extruded through a small die opening, having a diameter on the order of 0.040–0.125 inch, in the form of circular ribbons or strands of material. The extruded strands are passed onto a silicone-coated roll partially immersed in a water bath, so that upon rotation of the roll the extruded hot-melt strand is drawn through and quenched by the water bath. The resulting strand then is cut to predetermined lengths, stretched, and while under tension applied to a substrate of nonwoven polypropylene fiber material having a basis weight of 0.6 ounce per square yard, the self-adherent strands self-bond to the substrate material. The tensioning forces are then released and the bonded composite is thereby allowed to relax and form a contracted configuration. The bulk of the composite is increased by a factor of 10 as the gatherable webs are gathered into puckers.

By suitable choice of the gatherable web or webs to which the reticulated layer is bonded, composites according to the present invention may be utilized in numerous end-use applications, such as in thermal insulation garments and blankets, disposable swim wear, towels, wash cloths, training pants for infants and baby wipes, as well as scouring pads, mattresses, cushions, sleeping bags, and the like.

Thus both reuseable and disposable items (the latter term meaning items intended to be discarded after a single use rather than being laundered and re-used) are provided by the present invention.

Although the invention has been described in detail in connection with reticulated webs being formed of strands which are generally perpendicularly oriented to one another, it will be appreciated that the reticulated webs of the present invention may include configurations wherein tensioned constituent strands are disposed in other geometric arrays including geometrically irregular arrays with the strands in serpentine or random undulating arrangement wherein the reticulated web openings are irregular.

What is claimed is:

1. A bulked composite material comprising a reticulated web of elastic material bonded while held under differential tensioning forces to at least one gatherable web, the composite material having gathers formed therein by contraction of differentially tensioned portions of said reticulated web upon release of the tension forces whereby the composite is more bulked in some areas than in others.

2. The material of claim 1 wherein the reticulated web is bonded between two gatherable webs.

3. The material of claim 1 wherein the reticulated web comprises strands of different elastic characteristics.

4. The material of claim 1, claim 2 or claim 3 wherein said gatherable web is a nonwoven material.

5. The material of claim 1, claim 2 or claim 3 wherein said gatherable web is a polymeric film.

6. The material of claim 1, claim 2 or claim 3 wherein the elastic material of the reticulated web comprises a polyurethane resin.

7. The material of claim 1, claim 2 or claim 3 wherein the elastic material of the reticulated web comprises hot-melt extruded strands of elastic self-adherent material bonded under tension to one another.

8. The material of claim 7, wherein the hot-melt extruded strands of elastic self-adherent material are formed of a thermoplastic synthetic resin and rubber block copolymer composition.

9. The material of claim 1, claim 2 or claim 3 comprising a discrete web of said material having an hourglass-like configuration including a medial portion narrower and more highly bulked in its end portion, the higher bulk being obtained by placing the medial portion of said reticulated web under greater tension than the end portions while bonding the reticulated web to the gatherable web.

10. The material of claim 1, claim 2 or claim 3 wherein the reticulated web comprises individual strands joined together at their cross-over points.

11. A method of making a bulked web composite, comprising:

forming a reticulated web of elastic material;

elongating at least portions of the web by differentially tensioning different portions of the reticulated web;

bonding the differentially tensioned web to at least one gatherable web to form a composite material; and relaxing the composite to gather portions of the gatherable web.

12. The method of claim 11 including bonding the reticulated web between two gatherable webs.

13. The method of claim 11 or claim 12 including forming the reticulated web from elastic materials having different elastic characteristics.

14. The method of claim 11 or claim 12 including forming the composite web in an hourglass-like configuration having a medial portion which is narrower than its end portion and tensioning the medial portion of the reticulated web of a discrete web of the composite material to a greater extent than its end portions whereby, upon release of the tensioning forces, the composite contracts into a higher bulked configuration in the medial than in the end portion.

15. The method of claim 11 including forming the reticulated web by tensioning strands of elastic material and bonding the strands together to form said web.

* * * * *